US010347230B2

(12) United States Patent
Stroetz

(10) Patent No.: US 10,347,230 B2
(45) Date of Patent: Jul. 9, 2019

(54) DEVICE FOR INDICATING TROMBONE SLIDE POSITIONS AND RELATED SYSTEMS AND METHODS

(71) Applicant: Randolph Warren Stroetz, Rochester, MN (US)

(72) Inventor: Randolph Warren Stroetz, Rochester, MN (US)

(*) Notice: Subject to any disclaimer, the term of this patent is extended or adjusted under 35 U.S.C. 154(b) by 0 days.

(21) Appl. No.: 16/083,890

(22) PCT Filed: Nov. 18, 2016

(86) PCT No.: PCT/US2016/062803
§ 371 (c)(1),
(2) Date: Sep. 10, 2018

(87) PCT Pub. No.: WO2017/160353
PCT Pub. Date: Sep. 21, 2017

(65) Prior Publication Data
US 2019/0080675 A1    Mar. 14, 2019

Related U.S. Application Data

(60) Provisional application No. 62/307,689, filed on Mar. 14, 2016.

(51) Int. Cl.
*G10H 1/00*    (2006.01)
*G10H 1/02*    (2006.01)
(Continued)

(52) U.S. Cl.
CPC ............. *G10H 1/0016* (2013.01); *G10D 7/10* (2013.01); *G10H 1/02* (2013.01); *G10H 1/32* (2013.01);
(Continued)

(58) Field of Classification Search
CPC .......... G10H 1/0016; G10H 1/32; G10H 1/02; G10D 7/10
See application file for complete search history.

(56) References Cited

U.S. PATENT DOCUMENTS 2,990,744 A * 7/1961 Brilhart .................... G10D 7/10
                                                       84/388
6,087,572 A * 7/2000 Dillon ...................... G10D 9/00
                                                       84/387 R
(Continued)

OTHER PUBLICATIONS

Written Opinion of the International Search Authority for Corresponding PCT Patent App. Pub. No. WO2017160353.
(Continued)

*Primary Examiner* — Robert W Horn
(74) *Attorney, Agent, or Firm* — FisherBroyles, LLP; Edward R. Ergenzinger

(57) ABSTRACT

A device, system, and methods for indicating trombone slide positions is disclosed. Namely, a trombone slide position indicator is provided. In some embodiments, the trombone slide position indicator includes a slide position rod mounted in a fixed position in relation to the outer slide of the trombone. Further, a plurality (e.g., seven) slide position indicators are provided along the length of the slide position rod, wherein the positions of slide position indicators correspond to a certain pitch or note. A sensor guide is mounted to the outer slide, wherein the sensor guide moves with the outer slide and in relation to the fixed slide position rod. The sensor guide includes a mechanism for detecting and/or indicating close proximity to any one of the slide position indicators along the slide position rod. Further, a method of using the trombone slide position indicator is provided.

20 Claims, 13 Drawing Sheets

(51) Int. Cl.
*G10D 7/10* (2006.01)
*G10H 1/32* (2006.01)

(52) U.S. Cl.
CPC . *G10H 2220/005* (2013.01); *G10H 2220/411* (2013.01); *G10H 2220/521* (2013.01); *G10H 2230/181* (2013.01); *G10H 2240/211* (2013.01)

(56) References Cited

U.S. PATENT DOCUMENTS

| | | | | |
|---|---|---|---|---|
| 6,162,975 | A * | 12/2000 | Purdue | G09B 15/06 84/387 R |
| 7,402,738 | B2 * | 7/2008 | Sawada | G10D 7/10 84/380 R |
| 8,362,347 | B1 | 1/2013 | Scharfeld | |
| 2006/0037458 | A1 | 2/2006 | Guinness | |
| 2014/0013926 | A1 * | 1/2014 | Henry | G10D 7/10 84/396 |
| 2014/0090547 | A1 | 4/2014 | Udell, III et al. | |
| 2017/0213528 | A1 * | 7/2017 | Meehan | G10D 9/005 |
| 2019/0080675 | A1 * | 3/2019 | Stroetz | G10D 7/10 |

OTHER PUBLICATIONS

International Search Report for Corresponding PCT Patent App. Pub. No. WO2017160353.

\* cited by examiner

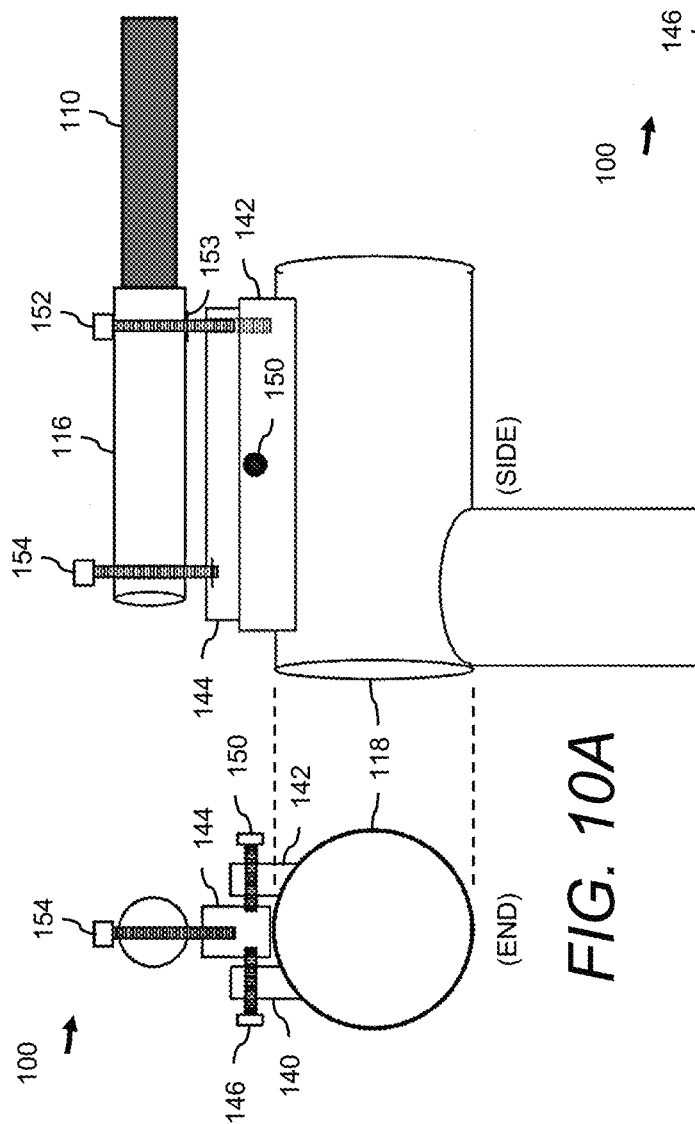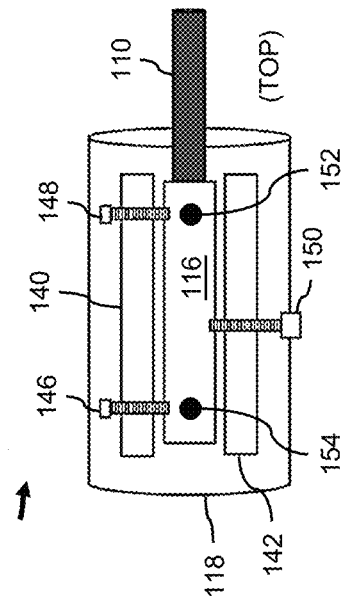

DEVICE FOR INDICATING TROMBONE SLIDE POSITIONS AND RELATED SYSTEMS AND METHODS

CROSS-REFERENCE TO RELATED APPLICATIONS

The present application is a 371 national phase entry of international application PCT/US16/62803, entitled "Device and Methodology to Indicate Trombone Positions," filed Nov. 18, 2016, which claims priority to provisional patent application number 62/307,689, entitled "Device and Methodology to Indicate Trombone Positions," filed Mar. 14, 2016; the entire contents of which are incorporated by reference herein in their entireties.

TECHNICAL FIELD

The presently disclosed subject matter relates generally to the field of teaching, learning, and improvement of musical instrument pedagogy and more particularly to a device, system, and methods for indicating trombone slide positions.

BACKGROUND

Learning to play any musical instrument involves the development and subsequent integration of numerous new skills in a way that is foreign to the student. There are new sensorimotor skills associated with the mechanics of the instrument that must be learned. There are cognitive skills that must be learned as well, not the least of which involves learning a complex new symbolic and auditory language. All of these skills must be integrated and assimilated in real time, while simultaneously being driven by the student's emotional expression of the music. In the end, producing music can be described as an expression of the simultaneous combined output of one's sensorimotor coordination, cognition, and emotional self (i.e., technique+human expression=art). The mastery of these technical skills along with their fluid integration frees an artist to convey or express all that is held within the emotional self.

Within the musical field, the trombone is known to have a relatively long learning curve compared to other instruments such as piano or saxophone. This is due to inherent difficulties in playing the trombone posed by its design. First, the trombone is a brass instrument. At their core, brass instruments produce sound via vibrations of the lips powered by the expiratory respiration muscles. This is not true of any other instrument group. Tone quality, pitch, range, and accuracy all require coordination between large expiratory muscle groups and the relatively much smaller orbicularis oris, buccal, and other facial muscles (embouchure), along with control of the relative size of the oral cavity and throat. The characteristic of the very beginning of a note as well as the note's length is accomplished with coordinated effort of the tongue and the respiratory muscles. This is referred to musically as articulation and is somewhat analogous to speaking, but requires additional effort for the development and integration of skills necessary to play with accurate pitch (i.e., to "play in tune").

A second aspect of the trombone that affects the difficulty of learning to play the instrument is its design. Although not appreciated by most, this instrument is especially hard to hold properly, especially by children and/or individuals with small or weak hands. Embouchure tension and hence, pitch, is affected by direct mouthpiece pressure, so holding the instrument in an unsteady or inconsistent way during playing will result in pitch fluctuations. Accordingly, when not held properly, the development of certain skills is impeded.

The design of the trombone also impacts playing difficulty since it is the only brass instrument that employs a slide-based system of operation. All common brass instruments except the trombone use valves to add mixed lengths of tubing to the air path in order to play the desired pitches. The accuracy of these additional lengths of tubing is inherently "guaranteed" simply by fully depressing the appropriate valve(s). The pitch controlling system employed by the trombone is much simpler, but much more difficult to learn and master since position locations are rather arbitrary. As was originally designed and is commonly embodied, the trombone has infinite control of tubing length throughout its range via the slide, which in essence is a relatively long, U-shaped section of telescopic tubing. The slide has no direct mechanism to provide accurate feedback as to how much length to add to produce a desired pitch.

In common practice, there are 7 recognized basic trombone slide "positions" which are described as approximate distances by visual reference, comparing a certain part of the moveable portion of the slide with the rim of the bell of the trombone and with parts of the end of the stationary part of the slide, commonly referred to as the "stockings". A player must learn these positions through a long and tedious development process, at first using these rather arbitrary visual cues, and over time (commonly 5 years to over a decade) eventually learning to incorporate auditory sensory feedback (e.g., by carefully developing the ability to hear his/her own sound's pitch while comparing it to both memorized pitch intervals and other musical instruments such as the piano) and then making adjustments to slide position as necessary. As this process develops, constant repetition over years of dedicated work eventually results in a form of memorized hand, arm, and shoulder positions. Furthermore, since pitch when playing the trombone is directly affected by embouchure tension, exhalation force, and also the slide position, and each of these elements is a continuous variable, a player needs to constantly monitor and quickly make slight adjustments to one or more of these variables to play accurately in terms of pitch. Hence, in the beginning, the fact that the embouchure takes (at the very least) many years to develop a degree of repeatable accuracy, even after developing the skill and focus to listen to the student's own pitch and make comparisons to other references, pitch accuracy is a moving target that commonly requires many more years to achieve a degree of mastery. Even by a typical master during performance, accuracy and repeatability in terms of measurable displacements may be a skill that is in constant flux to the extent that humans are not machines.

Accordingly, the introduction of an aide that brings consistency to any of the elements of pedagogy described above would be expected to shorten the learning curve for learning to play the trombone.

SUMMARY

The presently disclosed subject matter relates to a device, system, and methods for indicating trombone slide positions. Namely, a trombone slide position indicator is provided that can be used to aid a musician to play the trombone. As described in more detail below, various embodiments of trombone slide position indicators are provided. In one embodiment, visual position indicators are utilized. In another embodiment, magnetic sensor guides add tactile feedback to the visual feedback provided by the visual position indicators. In another embodiment, electronic sensor guides add real time displacement tracking to the visual and tactical feedback.

In one embodiment, a trombone slide position indicator device is provided comprising a trombone slide position rod mounted in a fixed position in relation to the outer slide of the trombone, wherein a plurality of slide position indicators are provided along the length of the slide position rod, and wherein the positions of the slide position indicators correspond to certain pitches or notes associated with a given trombone slide position. In other embodiments, the device further comprises a sensor guide mounted to the outer slide, wherein the sensor guide moves with the outer slide and in relation to the fixed slide position rod, and wherein the sensor guide comprises a mechanism for detecting and/or indicating close proximity to any one of the slide position indicators along the slide position rod. In other embodiments, the sensor guide utilizes magnetic force to generate a tactile indicator.

In other embodiments, the sensor guide is configured to generate a tactile and/or visual cue to the user as the sensor guide passes in close proximity to any one of the slide position indicators along the slide position rod. In other embodiments, the sensor guide is coupled atop a forward mount. In other embodiments, a rod attachment fitting is provided for holding the proximal end of the slide position rod, and wherein the rod attachment fitting is coupled atop a rear mount. In other embodiments, a slide stop is provided at the distal end of the slide position rod. In other embodiments, the plurality of slide position indicators provided along the length of the slide position rod comprise up to seven slide position indicators.

In other embodiments, the trombone comprises a bell, a tuning slide, a bell brace, a mouthpiece, a mouthpiece receiver, a slide receiver, a first slide brace, a second slide brace, an inner slide, and an outer slide. In other embodiments, the rear mount is fastened to the mouthpiece receiver and the first slide brace, thereby holding the rear mount in a fixed position relative to the mouthpiece. In other embodiments, the rod attachment fitting holding the proximal end of the slide position rod is coupled to the rear mount, thereby holding the slide position rod in a fixed position relative to the mouthpiece. In other embodiments, the forward mount is fastened to the outer slide at the second slide brace, wherein the forward mount is moveable together with the outer slide relative to the mouthpiece.

In other embodiments, the slide position rod is supported on one end by the rear mount and passes through the center portion of the sensor guide. In other embodiments, the forward mount and the rear mount hold the slide position rod substantially parallel to the outer slide. In other embodiments, the sensor guide is configured to slide along the slide position rod without interfering with the movement of the outer slide when the user moves the outer slide when playing the trombone.

In other embodiments, the sensor guide further comprises a magnet. In other embodiments, the slide position rod is formed of a non-ferromagnetic, non-magnetically responsive material. In other embodiments, the slide position indicators are formed of ferromagnetic, magnetically responsive material. In other embodiments, the magnetically responsive slide position indicators are configured such that as they pass by the magnet in the sensor guide the user is provided with tactile feedback comprising a slight momentary resistance due to the magnetically responsive slide position indicator entering and then departing the magnetic field of the magnet.

In other embodiments, the slide position indicators comprise magnets. In other embodiments, the slide position rod is formed of a non-ferromagnetic, non-magnetically responsive material. In other embodiments, the sensor guide is formed of ferromagnetic, magnetically responsive material. In other embodiments, the slide position indicators comprising magnets are configured such that as the magnetically responsive sensor guide passes the slide position indicators the user is provided with tactile feedback comprising a slight momentary resistance due to the magnetically responsive sensor guide entering and then departing the magnetic field of the magnet.

In other embodiments, seven slide position indicators are provided along the slide position rod in positions that substantially correspond to certain pitches or notes. In other embodiments, starting at the rod attachment fitting and in order, the first slide position indicator corresponds to the pitches or notes associated with the first trombone slide position, the second slide position indicator corresponds to the pitches or notes associated with the second trombone slide position, the third slide position indicator corresponds to the pitches or notes associated with the third trombone slide position, the fourth slide position indicator corresponds to the pitches or notes associated with the fourth trombone slide position, the fifth slide position indicator corresponds to the pitches or notes associated with the fifth trombone slide position, the sixth slide position indicator corresponds to the pitches or notes associated with the sixth trombone slide position, and the seventh slide position indicator corresponds to the pitches or notes associated with the seventh trombone slide position. In other embodiments, in relation to the first trombone slide position in which the slide is all the way in, the distance away from the first trombone slide position to the second slide position indicator is about 3.25 inches, the distance away from the first trombone slide position to the third slide position indicator is about 6.75 inches, the distance away from the first trombone slide position to the fourth slide position indicator is about 10.5 inches, the distance away from the first trombone slide position to the fifth slide position indicator is about 14.5 inches, the distance away from the first trombone slide position to the sixth slide position indicator is about 18.75 inches, and the distance away from the first trombone slide position to the seventh slide position indicator is about 23.25 inches. In other embodiments, the positions of the plurality of slide position indicators are fixed or adjustable along the slide position rod.

In other embodiments, the forward mount is a bracket that supports a first attachment clip for clasping to the second slide brace of the trombone, and a second attachment clip for clasping to the outer slide of the trombone, wherein the attachment clips are detachable. In other embodiments, the sensor guide is integrated as one piece with the forward mount.

In other embodiments, the sensor guide comprises a set of bearings for slideably supporting the slide position rod. In other embodiments, the sensor guide comprises a tube member for holding the magnet such that the end of the magnet is in close proximity to the slide position rod. In other embodiments, the slide position rod is within the magnetic field of the magnet. In other embodiments, the rear mount is a bracket that supports a first attachment clip for clasping to the first slide brace of the trombone, and a second attachment clip for clasping to the mouthpiece receiver of the trombone. In other embodiments, the attachment clips are detachable.

In other embodiments, the rod attachment fitting comprises an indexed ball joint, wherein the indexed ball joint comprises a ball fitted into a socket. In other embodiments, a slot in the side of the socket mates with a guide pin on the ball. In other embodiments, the guide pin aligns the slide position rod radially so that slide position indicators are aligned with and pass by the magnet on the sensor guide. In other embodiments, the rod attachment fitting comprises a swivel joint. In other embodiments, a slot is provided in the slide position rod and a non-ferromagnetic, non-magnetically responsive slug is provided in the slot, and further wherein a ferromagnetic, magnetically responsive machine screw is threaded into the slug, thereby forming a slide position indicator. In other embodiments, the position of the slug and the machine screw is adjustable along the slot. In other embodiments, the top of the rear mount that receives the rod attachment fitting has a first fixed side member, a second fixed side member, and a floating member arranged between the first fixed side member and the second fixed side member.

In other embodiments, a first thumbscrew and a second thumbscrew are threaded through the first fixed side member and mate with unthreaded pockets in one side of the floating member. In other embodiments, a thumbscrew is threaded through the second fixed side member and mated with an unthreaded pocket in the other side of the floating member. In other embodiments, the first thumbscrew and the second thumbscrew are configured to adjust the displacement and yaw of the rod attachment fitting and the slide position rod. In other embodiments, a thumbscrew passes through an unthreaded hole in the forward portion of the rod attachment fitting, and further wherein the thumbscrew is threaded through a circle clip and threaded into a threaded hole in the floating member. In other embodiments, a thumbscrew is threaded through a rear portion of the rod attachment fitting and mated with an unthreaded pocket in the floating member, and further wherein the thumbscrews are configured to adjust the displacement and pitch of the rod attachment fitting and of the slide position rod.

In other embodiments, the slide position indicators comprise visible rings or bands that are fixed or adjustable along the slide position rod. In other embodiments, the device further comprises a pointer feature wherein the user can observe when a certain slide position indicator is aligned with the pointer feature. In other embodiments, the rod attachment fitting is a fork design that can snap fit into the rear mount and be easily disassembled.

In other embodiments, a system is provided for indicating trombone slide positions comprising any of the trombone slide position indicators described herein, a computing device, and a communications interface for communicating the trombone slide position information to the computing device. In other embodiments, the computing device is comprises a desktop application, a mobile app, and/or any other software or hardware for processing the information from the trombone slide position indicator.

Certain aspects of the presently disclosed subject matter having been stated hereinabove, which are addressed in whole or in part by the presently disclosed subject matter, other aspects will become evident as the description proceeds when taken in connection with the accompanying Examples as best described herein below.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

FIG. 10A and FIG. 10B illustrate various views of another configuration of a rear mount of the presently disclosed trombone slide position indicator;

DETAILED DESCRIPTION

Figure 1:
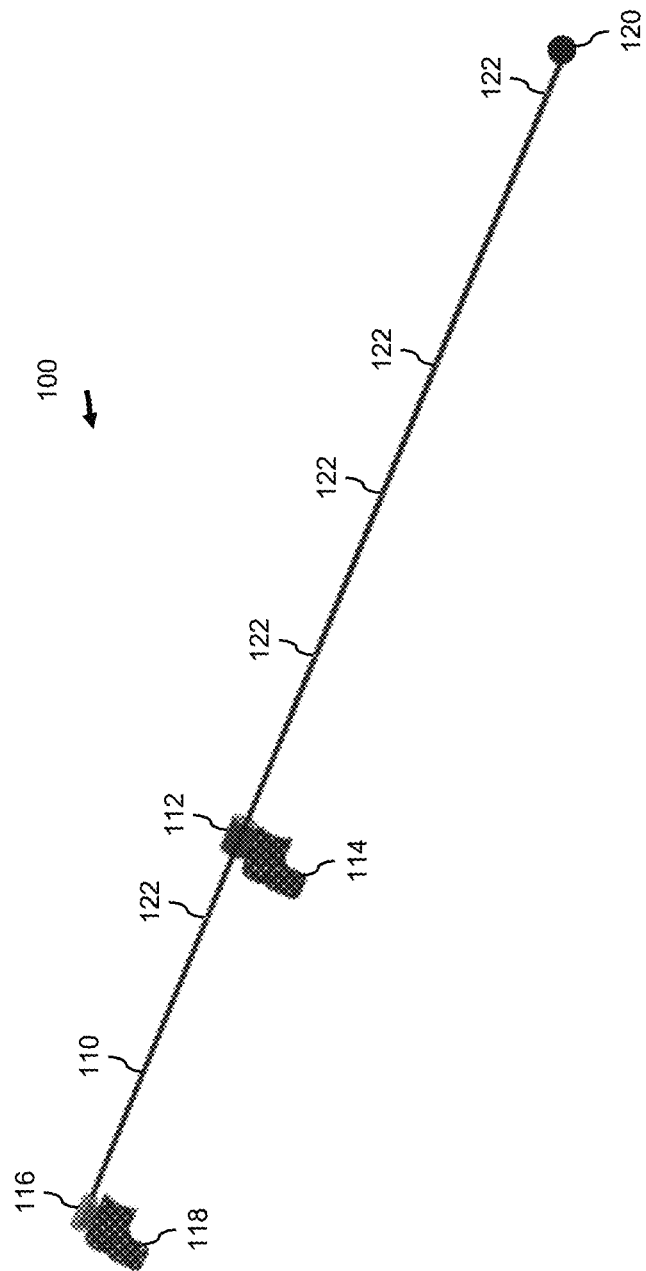
FIG. 1 illustrates a side view of an example of the presently disclosed trombone slide position indicator, wherein the operation of the trombone slide position indicator is based on tactile indicators.

The presently disclosed subject matter now will be described more fully hereinafter. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions. Therefore, it is to be understood that the presently disclosed subject matter is not to be limited to the specific embodiments disclosed and that modifications and other embodiments are intended to be included within the scope of the appended claims.

The presently disclosed subject matter relates to a device, system, and methods for indicating trombone slide positions. Namely, a trombone slide position indicator is provided that can be used to aid a musician to play the trombone. For example, the trombone slide position indicator can provide independent visual and/or neuro-mechanical tactile sensory feedback for each position of a conventional slide trombone. This visual and/or tactile feedback, along with appropriate use methodology, addresses key factors unique to the trombone, which render it particularly difficult to learn and master.

As described in more detail below, various embodiments of trombone slide position indicators are provided. In one embodiment, visual position indicators are utilized. In another embodiment, magnetic sensor guides add tactile feedback to the visual feedback provided by the visual position indicators. In another embodiment, electronic sensor guides add real time displacement tracking to the visual and tactical feedback.

In some embodiments, the trombone slide position indicator includes a slide position rod mounted in a fixed position in relation to the outer slide of the trombone. Further, a plurality (e.g., seven) slide position indicators are provided along the length of the slide position rod, wherein the positions of slide position indicators correspond to a certain pitch or note. A sensor guide is mounted to the outer slide, wherein the sensor guide moves with the outer slide and in relation to the fixed slide position rod. The sensor guide includes a mechanism for detecting and/or indicating close proximity to any one of the slide position indicators along the slide position rod. In one example, the sensor guide uses magnetic force to generate a tactile indicator. When playing the trombone, as the sensor guide passes in close proximity to any one of the slide position indicators along the slide position rod, a tactile and/or visual cue is provided to the user. In so doing, the user may be able to more rapidly recognize and learn the correct slide position for a certain pitch or note compared to playing the trombone without the trombone slide position indicator.

In some embodiments, a system is provided for transmitting slide positions from the presently disclosed trombone slide position indicator to any computing device, wherein the computing device includes a desktop application, mobile app, and/or any other software or hardware for processing the information from the trombone slide position indicator.

Referring now to FIG. 1 is a side view of an example of the presently disclosed trombone slide position indicator 100, wherein the operation of the trombone slide position indicator 100 is based on tactile indicators. The trombone slide position indicator 100 includes a slide position rod 110 in relation to a sensor guide 112. Namely, the slide position rod 110 passes through the sensor guide 112 and the sensor guide 112 can slide along the slide position rod 110. The sensor guide 112 is coupled atop a forward mount 114. Further, a rod attachment fitting 116 is provided for holding the proximal end of the slide position rod 110, wherein the rod attachment fitting 116 is coupled atop a rear mount 118. Further, a slide stop 120 is provided at the distal end of the slide position rod 110. A plurality of slide position indicators 122 is provided along the length of the slide position rod 110. For example, six to seven of the slide position indicators 122 can be provided along the slide position rod 110.

Figure 2:
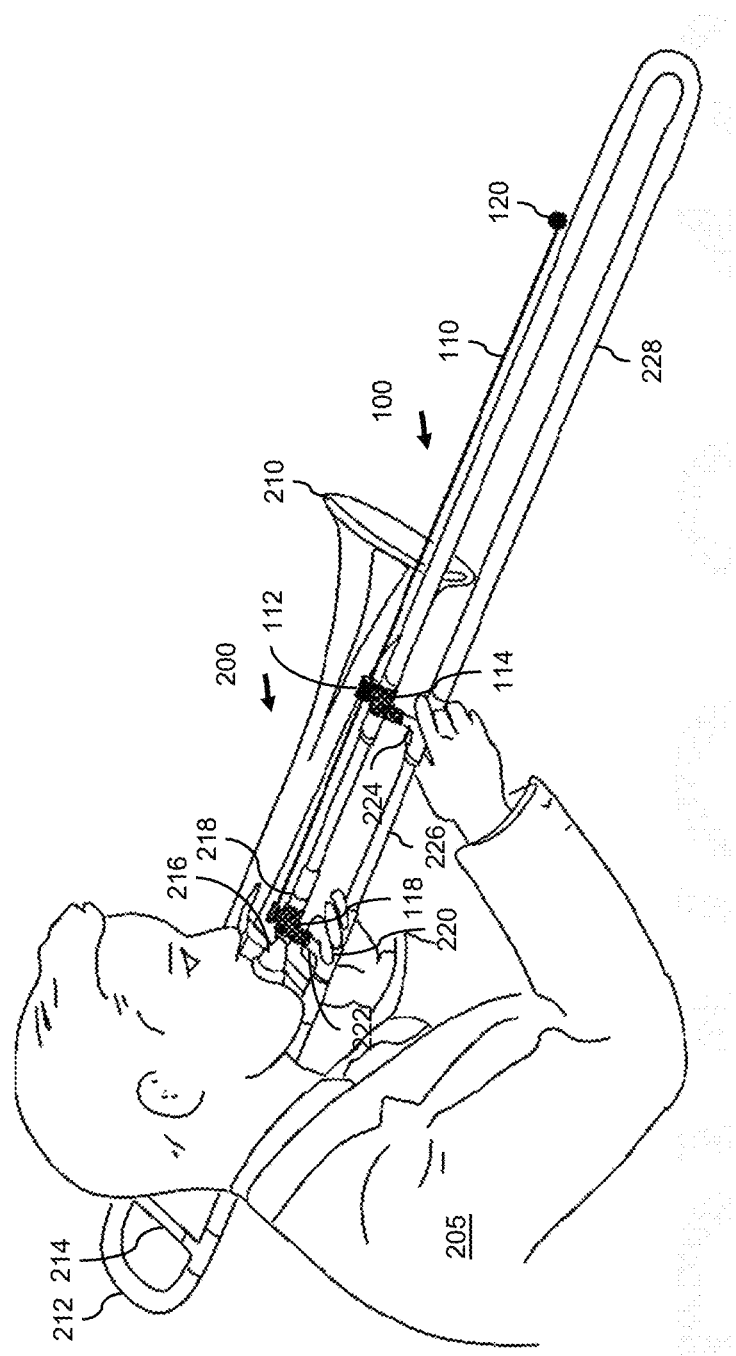
FIG. 2 illustrates a side view of an example of the presently disclosed trombone slide position indicator installed on a standard trombone.

Referring now to FIG. 2 is a side view of an example of the presently disclosed trombone slide position indicator 100 installed on a trombone 200. The trombone 200 can be any standard trombone. There are four basic types/sizes of trombones; alto, small bore tenor, large bore tenor, and bass. The trombone 200 can be any one of these types/sizes. Generally, the trombone 200 includes a bell 210, a tuning slide 212, a bell brace 214, a mouthpiece 216, a mouthpiece receiver 218, a slide receiver 220, a first slide brace 222, a second slide brace 224, an inner slide 226, and an outer slide 228. FIG. 2 also shows a user 205 playing the trombone 200 with the trombone slide position indicator 100 installed thereon.

In the presently disclosed trombone slide position indicator 100, the rear mount 118 is fastened to the mouthpiece receiver 218 and the first slide brace 222. Therefore, the rear mount 118 is held in a fixed position relative to, for example, the mouthpiece 216. Likewise, because the rod attachment fitting 116, which is holding the proximal end of the slide position rod 110, is coupled to the rear mount 118, then the slide position rod 110 is held in a fixed position relative to, for example, the mouthpiece 216. By contrast, the forward mount 114 is fastened to the outer slide 228 at the second slide brace 224. Therefore, the forward mount 114 is moveable together with the outer slide 228 relative to, for example, the mouthpiece 216. Further, the slide position rod 110, which is supported on one end by the rear mount 118, passes through the center portion of the sensor guide 112. Accordingly, the forward mount 114 and the rear mount 118 hold the slide position rod 110 substantially parallel to the outer slide 228. Further, when the user 205 moves the outer slide 228 when playing the trombone 200, the sensor guide 112 is able to slide along the slide position rod 110 without interfering with the movement of the outer slide 228.

Referring now again to FIG. 1, in one example, the sensor guide 112 can include a magnet 124 (not visible in FIG. 1 and FIG. 2, see FIG. 3 through FIG. 9). Further, the slide position rod 110 is formed of a non-ferromagnetic, non-magnetically responsive material, such as, but not limited to, plastic, aluminum, and the like. By contrast, the slide position indicators 122 are formed of ferromagnetic, magnetically responsive material, such as, but not limited to, iron, steel, and the like. In operation, when any one of the magnetically responsive slide position indicators 122 passes by the magnet 124 in the sensor guide 112, the user 205 feels a slight momentary resistance due to the magnetically responsive slide position indicator 122 entering and then departing the magnetic field of the magnet 124. In this way, the trombone slide position indicator 100 provides a tactile indicator to the user 205.

In another example, the configuration is reversed. For example, the slide position indicators 122 are magnets, while a member in the sensor guide 112 is formed of ferromagnetic, magnetically responsive material, such as, but not limited to, iron, steel, and the like. As in the previous configuration, when any one of the magnetic slide position indicators 122 passes by the magnetically responsive member in the sensor guide 112, the user 205 feels a slight momentary resistance due to the magnetically responsive member entering and then departing the magnetic field of the magnetic slide position indicator 122.

In one example, seven slide position indicators 122 are provided along the slide position rod 110 in positions that substantially correspond to certain pitches or notes. Namely, starting at the rod attachment fitting 116 and in order, the first slide position indicator 122 corresponds to the pitches or notes associated with the first trombone slide position, the second slide position indicator 122 corresponds to the pitches or notes associated with the second trombone slide position, the third slide position indicator 122 corresponds to the pitches or notes associated with the third trombone slide position, the fourth slide position indicator 122 corresponds to the pitches or notes associated with the fourth trombone slide position, the fifth slide position indicator 122 corresponds to the pitches or notes associated with the fifth trombone slide position, the sixth slide position indicator 122 corresponds to the pitches or notes associated with the sixth trombone slide position, and the seventh slide position indicator 122 corresponds to the pitches or notes associated with the seventh trombone slide position.

In one example, in relation to the first trombone slide position in which the slide is all the way in, the distance away from the first trombone slide position to the second slide position indicator 122 is about 3.25 inches, the distance away from the first trombone slide position to the third slide position indicator 122 is about 6.75 inches, the distance away from the first trombone slide position to the fourth slide position indicator 122 is about 10.5 inches, the distance away from the first trombone slide position to the fifth slide position indicator 122 is about 14.5 inches, the distance away from the first trombone slide position to the sixth slide position indicator 122 is about 18.75 inches, and the distance away from the first trombone slide position to the seventh slide position indicator 122 is about 23.25 inches. Further, the positions of the multiple slide position indicators 122 can be fixed or adjustable along the slide position rod 110.

More details of examples of the presently disclosed trombone slide position indicator 100 are shown and described hereinbelow with reference to FIG. 3 through FIG. 11.

Figure 3:
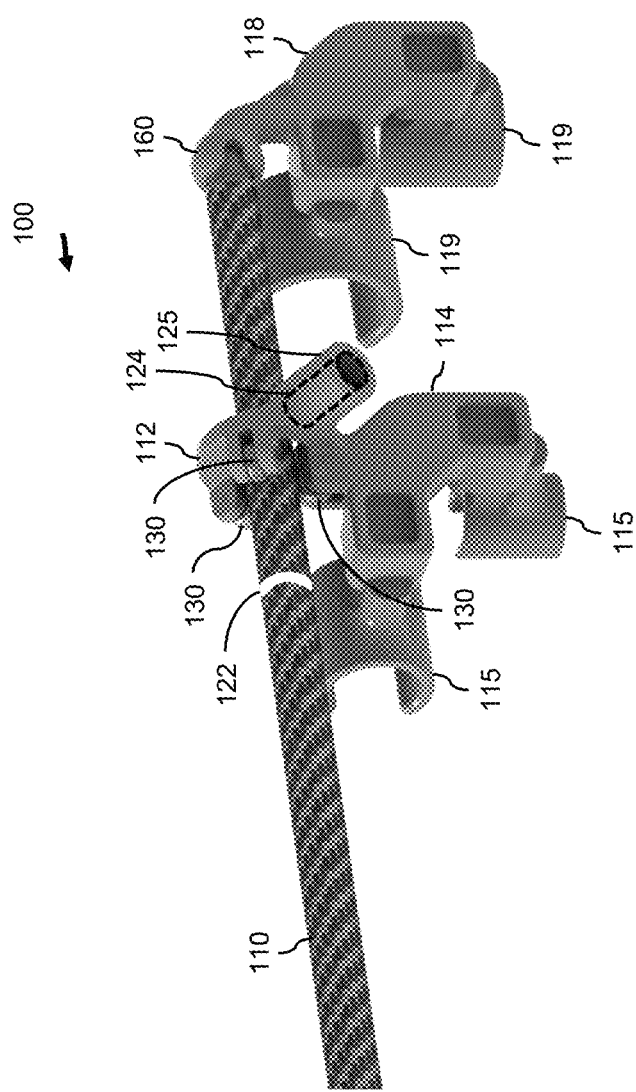
FIG. 3 and FIG. 4 illustrate perspective views of an example of the presently disclosed trombone slide position indicator, wherein the operation of the trombone slide position indicator is based on tactile indicators.
Figure 4:
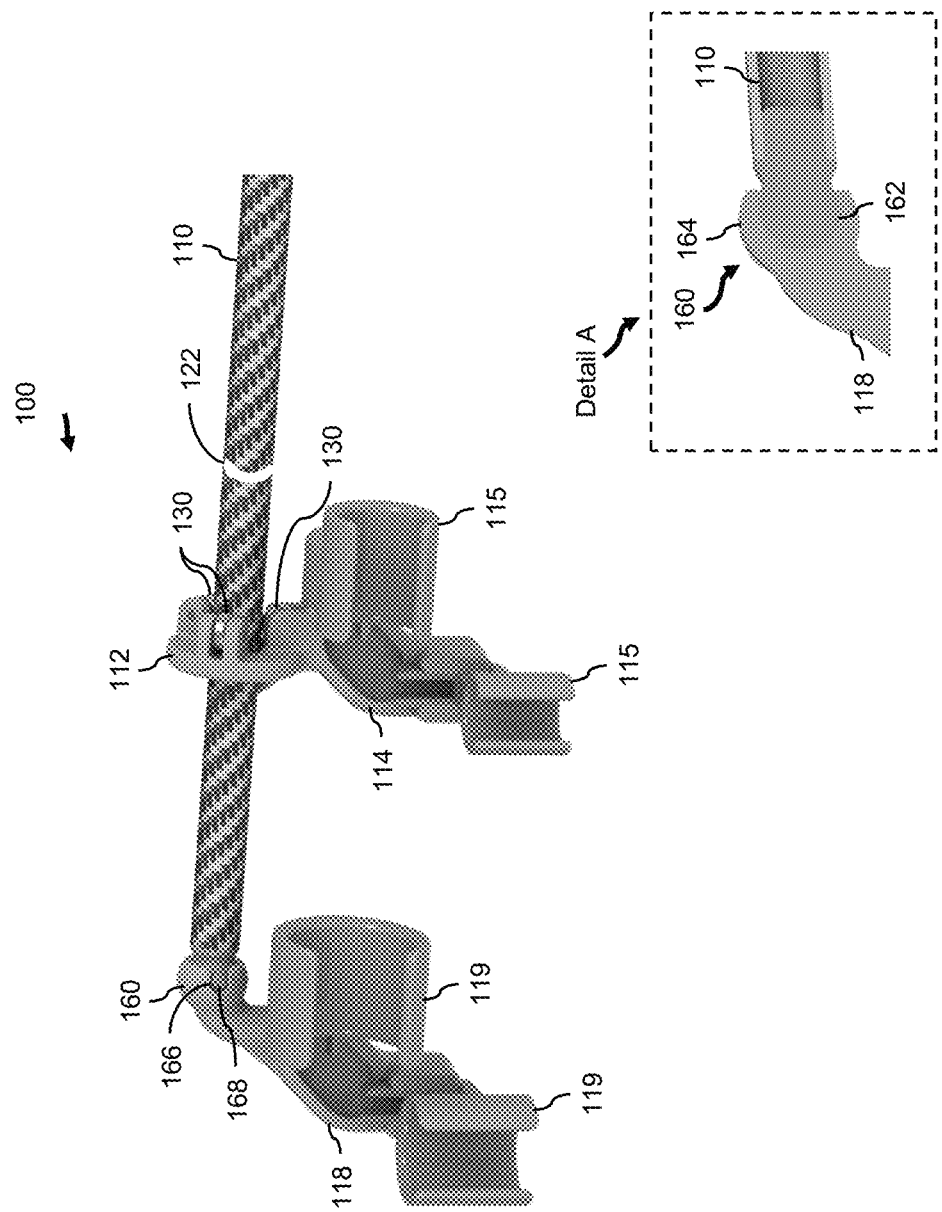

Referring now to FIG. 3 and FIG. 4 is perspective views of an example of the presently disclosed trombone slide position indicator 100, wherein the operation of the trombone slide position indicator 100 is based on tactile indicators. In this example, the slide position rod 110 may be formed of molded plastic and the slide position indicators 122 can be iron or steel rings that can be fixed or adjustable along the slide position rod 110. Further, the sensor guide 112, the forward mount 114, and the rear mount 118 are formed of molded plastic.

The forward mount 114 is a bracket that supports a first attachment clip 115 for clasping to the second slide brace 224 of the trombone 200 and a second attachment clip 115 for clasping to the outer slide 228 of the trombone 200, wherein the attachment clips 115 are detachable. The sensor guide 112 is integrated as one piece with the forward mount 114. Further, the sensor guide 112 includes a set of bearings 130 (e.g., ball bearings or roller bearings) for slideably supporting the slide position rod 110. Additionally, the sensor guide 112 includes a tube member 125 for holding the magnet 124 such that the end of the magnet 124 is in close proximity to the slide position rod 110. Namely, the slide position rod 110 is within the magnetic field of the magnet 124.

The rear mount 118 is a bracket that supports a first attachment clip 119 for clasping to the first slide brace 222 of the trombone 200 and a second attachment clip 119 for clasping to the mouthpiece receiver 218 of the trombone 200, wherein the attachment clips 119 are detachable. The detachable and interchangeable attachment clips 115, 119 accommodate the various tubing diameters of different trombones and make mounting and dismounting the trombone slide position indicator 100 quick and secure.

In this example, the rod attachment fitting 116 is implemented via an indexed ball joint 160, i.e., a swivel mechanism. For example, a Detail A shown in FIG. 4 shows that the indexed ball joint 160 includes a ball 162 fitted into a socket 164. The indexed ball joint 160 accommodates the small vertical and horizontal displacements to rod angle that is necessary to assure very smooth gliding over the entire side position range. Referring now to FIG. 4, a slot 166 in the side of the socket 164 mates with a guide pin 168 on the ball 162, which assures that the slide position rod 110 is correctly oriented radially when the slide position rod 110 is attached. The slide position rod 110 is attached by snapping the ball/rod assembly into the socket 164 and the guide pin 168 aligns the slide position rod 110 radially so that slide position indicators 122 are aligned with, and pass by the magnet 124 on the sensor guide 112. Namely, the indexed ball joint 160 provides a rod connection that can swivel both vertically and horizontally to prevent binding even with very close tolerances and alignment.

Further, the trombone slide position indicator 100 shown in FIG. 3 and FIG. 4 makes dismounting very simple and easy in order to put the trombone 200 and the trombone slide position indicator 100 in the case. The ball 162 is a snap fit into the socket 164 and fits through the sensor guide 112. In this example, a process of dismounting the trombone slide position indicator 100 from the trombone 200 includes the steps of: (1) pulling the ball 162-end of the slide position rod 110 out of the socket 164, then through the sensor guide 112, and then place the slide position rod 110 next to the cleaning rod in the trombone's case, and (2) pulling both the forward mount 114 and the rear mount 118 off the trombone 200 via the attachment clips 115, 119. The forward mount 114 and the rear mount 118 are very small, light, and tough so that they can be tossed into the case anywhere.

Figure 5:
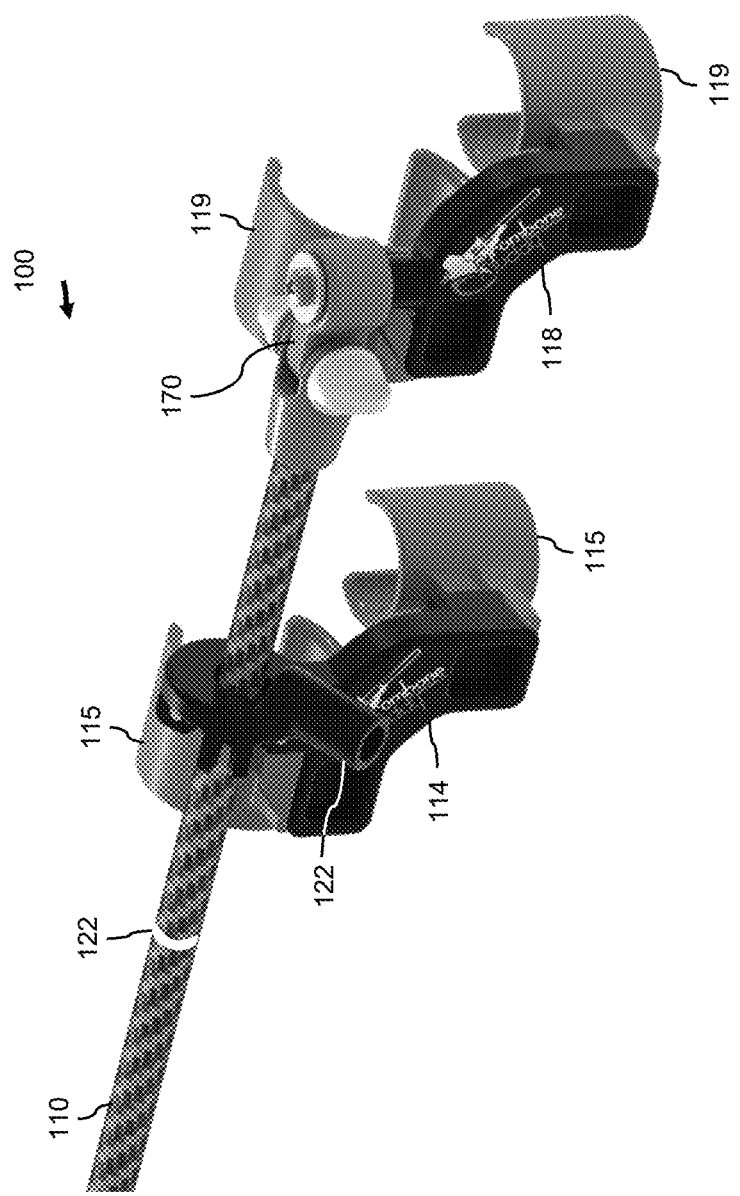
FIG. 5 illustrates a perspective view of another example of the presently disclosed trombone slide position indicator, wherein the operation of the trombone slide position indicator is based on tactile indicators.
Figure 6:
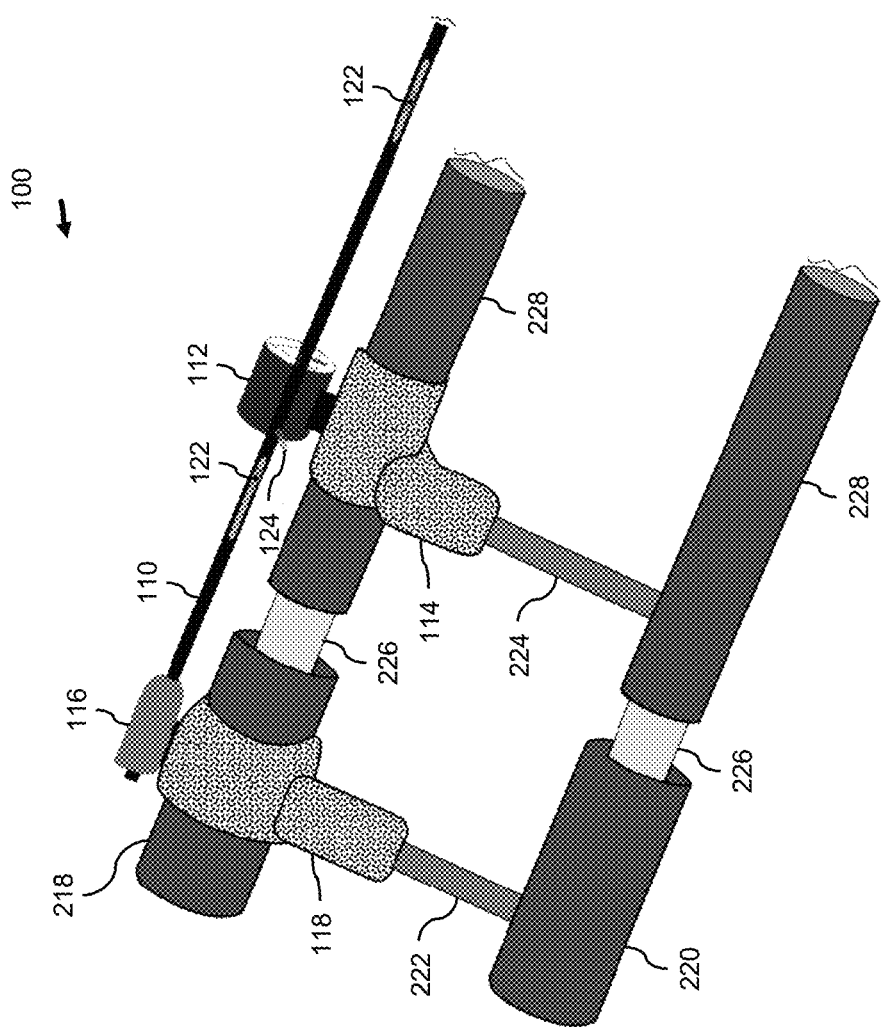
FIG. 6 illustrates a perspective view of yet another example of the presently disclosed trombone slide position indicator.

Referring now to FIG. 5 is a perspective view of another example of the presently disclosed trombone slide position indicator 100, wherein the operation of the trombone slide position indicator 100 is based on tactile indicators. This example is substantially the same as the trombone slide position indicator 100 shown in FIG. 3 and FIG. 4 except that the indexed ball joint 160 is replaced with a swivel joint 170. Like the indexed ball joint 160, the swivel joint 170 provides a rod connection that can swivel both vertically and horizontally to prevent binding even with very close tolerances and alignment.

Referring now to FIG. 6, FIG. 7, FIG. 8, and FIG. 9 is yet another example of the presently disclosed trombone slide position indicator 100. Again, the forward mount 114 is fastened to the outer slide 228 at the second slide brace 224 of the trombone 200 and the rear mount 118 is fastened to the mouthpiece receiver 218 and the first slide brace 222. In this example and referring now to FIG. 7, to implement each slide position indicator 122, a slot 126 is provided in the slide position rod 110. Then, a non-ferromagnetic, non-magnetically responsive slug 128 (e.g., a plastic slug 128) is provide in the slot 126. Then, the slide position indicator 122 in the form of a ferromagnetic, magnetically responsive machine screw 122 is threaded into the slug 128. The position of the slug 128 and the machine screw 122 is adjustable along the slot 126, which allows precise adjustment of the trombone slide position indication.

Figure 7:
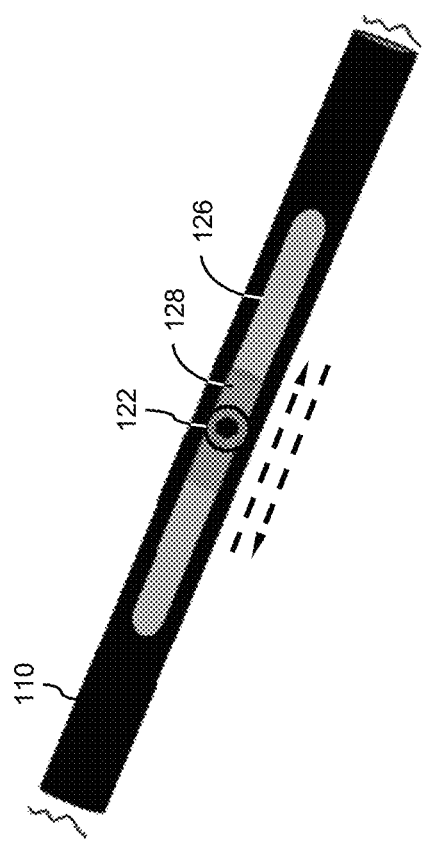
FIG. 7 illustrates a perspective view of a portion of a slide position rod of the trombone slide position indicator shown in FIG. 6.
Figure 8:
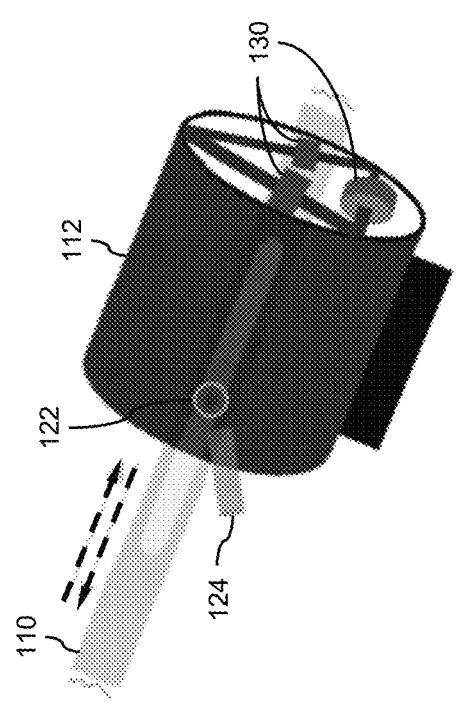
FIG. 8 illustrates a perspective view of a sensor guide of the trombone slide position indicator shown in FIG. 6.
Figure 9:
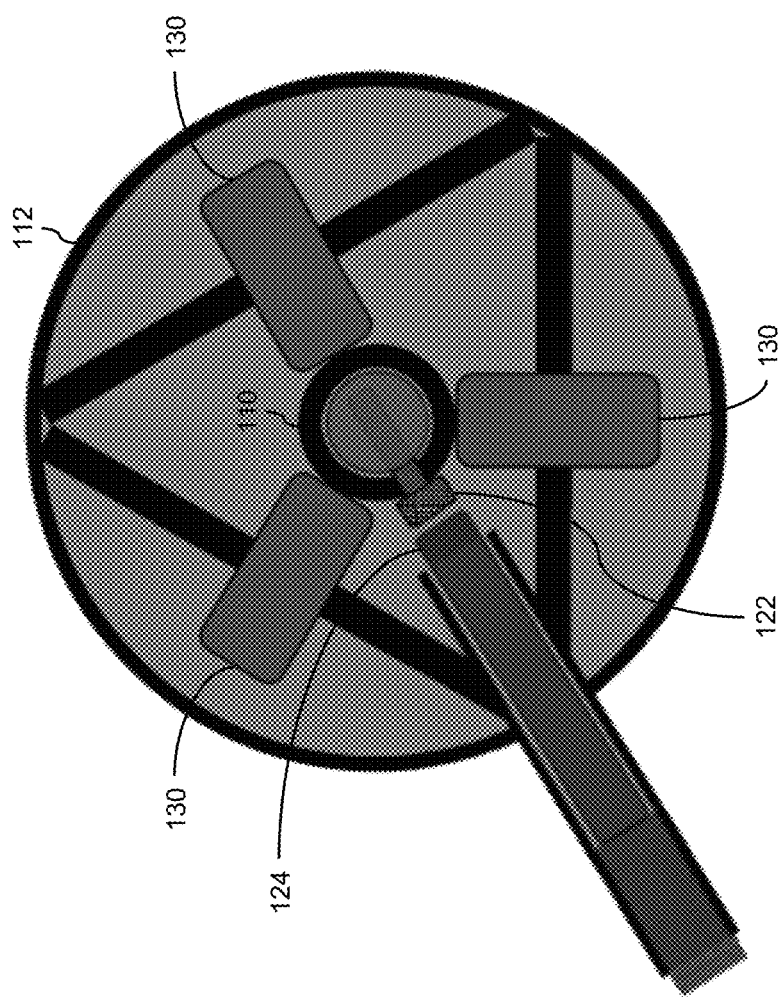
FIG. 9 illustrates an end view of the sensor guide of the trombone slide position indicator shown in FIG. 6.

In this example and referring now to FIG. 7, FIG. 8, and FIG. 9, a side view, a perspective view, and an end view are shown of another example of the sensor guide 112. Namely, FIG. 7, FIG. 8, and FIG. 9 show the arrangement of bearings 130 (e.g., ball or roller bearings) for slideably supporting the slide position rod 110 and the magnet 124 arranged in close proximity to the slide position rod 110.

FIG. 10A and FIG. 10B illustrate various views of another configuration of the rear mount 118 of the presently disclosed trombone slide position indicator 100. In this example, the rod attachment fitting 116 may be a metal or plastic member. The top of the rear mount 118 that receives the rod attachment fitting 116 has a first fixed side member 140, a second fixed side member 142, and a floating member 144 arranged between the first fixed side member 140 and the second fixed side member 142.

A first thumbscrew 146 and a second thumbscrew 148 are threaded through the first fixed side member 140 and mate with unthreaded pockets in one side of the floating member 144. Similarly, a thumbscrew 150 is threaded through the second fixed side member 142 and mated with an unthreaded pocket in the other side of the floating member 144. The first thumbscrew 146 and the second thumbscrew 148 can be used to adjust the displacement and yaw of the rod attachment fitting 116 and of the slide position rod 110. The thumbscrew 150 can be used to remove the rod attachment fitting 116 and the slide position rod 110.

A thumbscrew 152 passes through an unthreaded hole in forward portion of the rod attachment fitting 116. Then, the thumbscrew 152 is threaded through a circle clip 153 and threaded into a threaded hole in the floating member 144. A thumbscrew 154 is threaded through a rear portion of the rod attachment fitting 116 and mated with an unthreaded pocket in the floating member 144. The thumbscrew 152 and the thumbscrew 154 can be used to adjust the displacement and pitch of the rod attachment fitting 116 and of the slide position rod 110.

Figure 11:
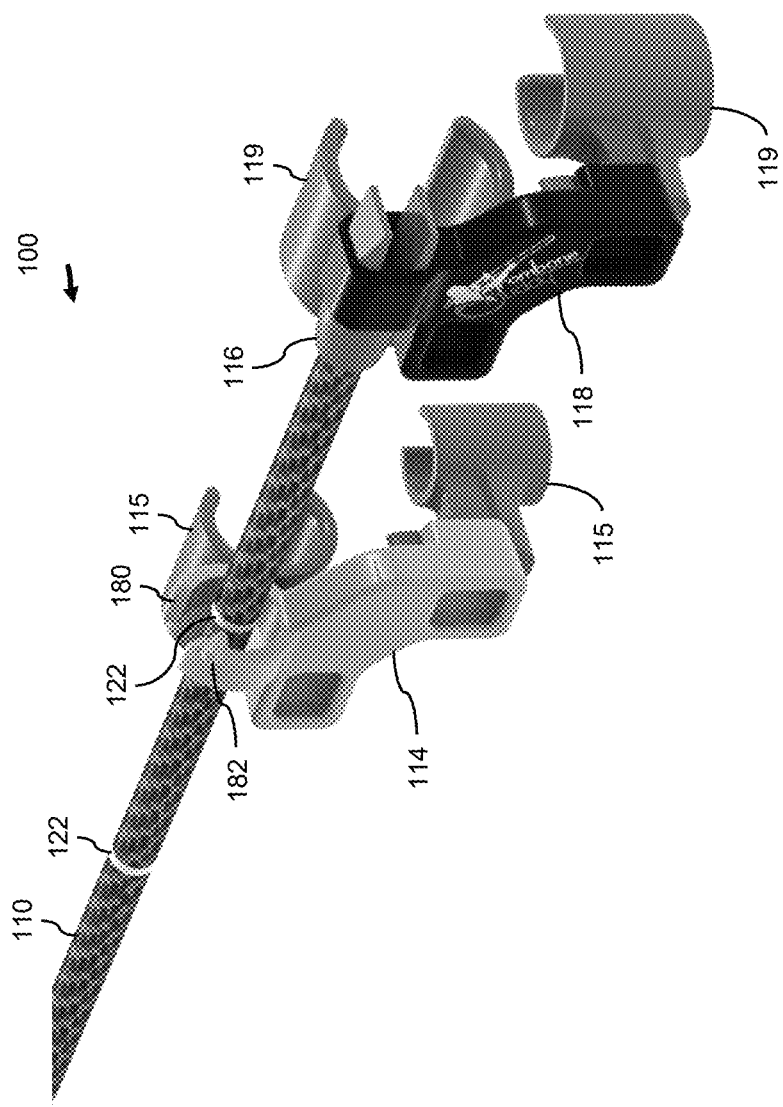
FIG. 11 illustrates a perspective view of still another example of the presently disclosed trombone slide position indicator, wherein the operation of the trombone slide position indicator is based on visual indicators.

FIG. 11 illustrates a perspective view of still another example of the presently disclosed trombone slide position indicator 100, wherein the operation of the trombone slide position indicator 100 is based on visual indicators. This example is substantially the same as the trombone slide position indicator 100 shown in FIG. 3 and FIG. 4 except that the magnet-based the sensor guide 112 is replace with a visual observation-based guide 180. In this example, the slide position indicators 122 can be visible rings or bands that can be fixed or adjustable along the slide position rod 110. The visual observation-based guide 180 has a pointer feature 182, wherein the user 205 can observe when a certain slide position indicator 122 is aligned with the pointer feature 182.

Further, in this example, the rod attachment fitting 116 is a fork design that can snap fit into the rear mount 118 and be easily disassembled. For example, simply squeeze the prongs of the forked rod attachment fitting 116 to release from the rear mount 118. Then, squeeze the prongs of the forked rod attachment fitting 116 again and pull it through the visual observation-based guide 180.

Figure 12:
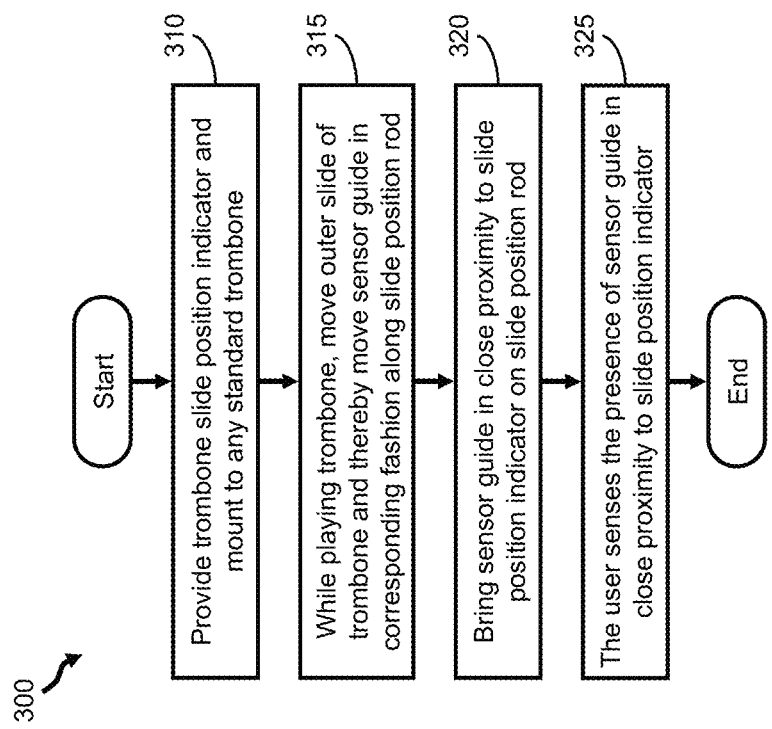
FIG. 12 illustrates a flow diagram of an example of a method of using the presently disclosed trombone slide position indicator.

FIG. 12 illustrates a flow diagram of an example of a method 300 of using the presently disclosed trombone slide position indicator 100. The method 300 may include, but is not limited to, the following steps.

At a step 310, the trombone slide position indicator 100 is provided and then mounted to any standard trombone. For example, the trombone slide position indicator 100 is provided and then mounted to the trombone 200 using the forward mount 114 and the rear mount 118.

At a step 315, while playing trombone, the outer slide 228 of the trombone 200 is moved and in corresponding fashion the sensor guide 112 of the trombone slide position indicator 100 is slideably moved along the slide position rod 110.

At a step 320, the sensor guide 112 of the trombone slide position indicator 100 is brought in close proximity to a certain slide position indicator 122 on the slide position rod 110.

At a step 325, the user 205 senses the presence of the sensor guide 112 of the trombone slide position indicator 100 in close proximity to a certain slide position indicator 122. For example, when any one of the magnetically responsive slide position indicators 122 passes by the magnet 124 in the sensor guide 112, the user 205 feels a slight momentary resistance due to the magnetically responsive slide position indicator 122 entering and then departing the magnetic field of the magnet 124. In this way, the trombone slide position indicator 100 provides a tactile indicator to the user 205. In other example, a visual cue is provided as shown in FIG. 11.

Figure 13:
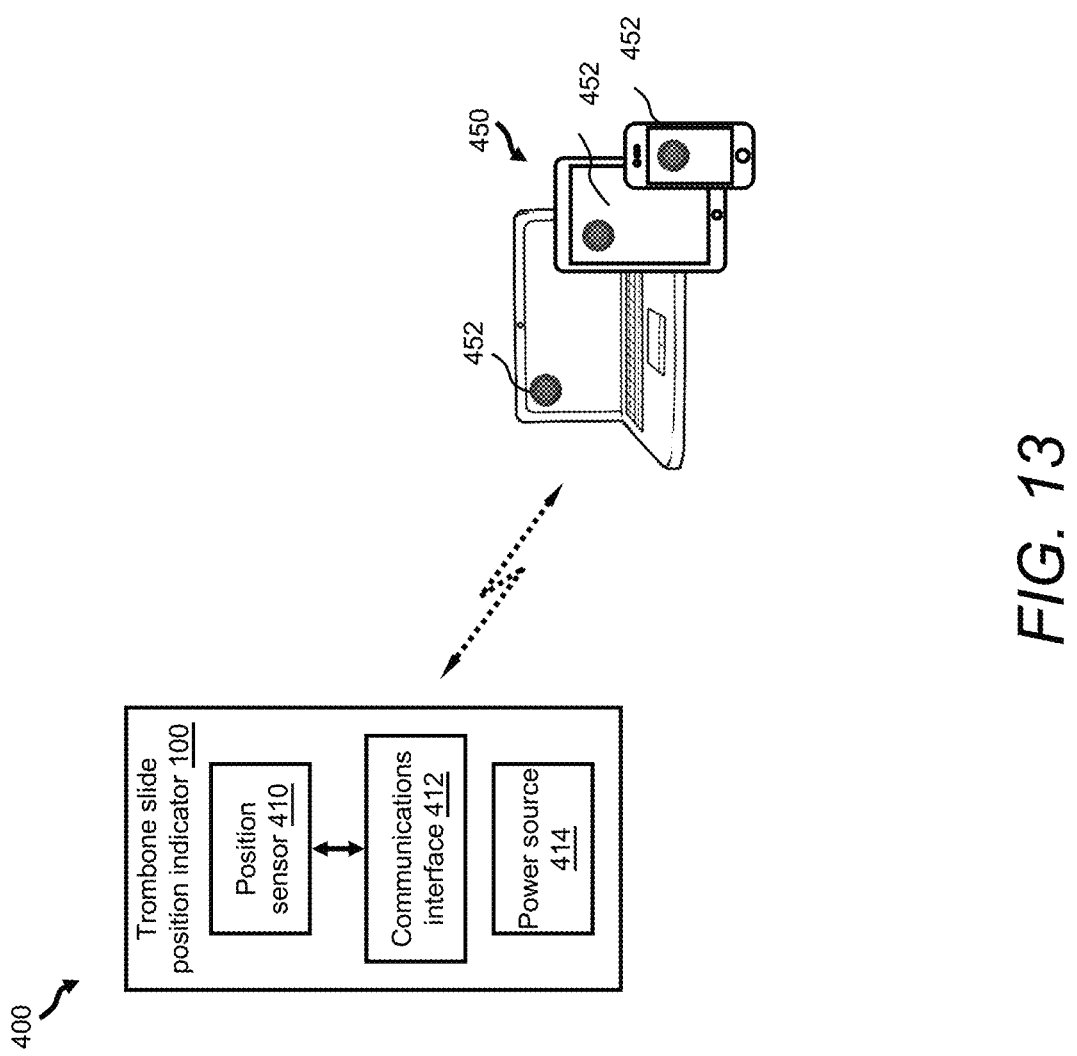
FIG. 13 illustrates a block diagram of an example of a system for transmitting slide positions from the presently disclosed trombone slide position indicator to any computing device.

FIG. 13 illustrates a block diagram of an example of a system 400 for transmitting slide positions from the presently disclosed trombone slide position indicator 100 to any computing device. Namely, certain electronics can be integrated into the forward mount 114 that includes the sensor guide 112. For example, the trombone slide position indicator 100 can include a position sensor 410, a communications interface 412, and a power source 414 (e.g., a battery). The position sensor 410 can be any sensing device that can sense slide position indicators 122 in close proximity to the sensor guide 112 and that can generate a signal indication so. In one example, position sensor 410 is an optically-based sensor.

Any electronic sensing device may be used within the present invention, including without limitation, electronic sensing devices that utilize Capacitive, Doppler effect, Eddy current, Inductive, Laser rangefinder, Magnetic, Passive optical (CCD), Infrared, Photocell, Radar, Sonar, Ultrasonic, Fiber optic, and Hall effect sensor mechanisms.

The communications interface 412 may be any wired and/or wireless communication interface for connecting to a network (not shown) and by which information may be exchanged with other devices connected to the network. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, ISM, Bluetooth® technology, Bluetooth® Low Energy (BLE) technology, Wi-Fi, Wi-Max, IEEE 402.11 technology, ZigBee technology, Z-Wave technology, 6LoW-PAN technology (i.e., IPv6 over Low Power Wireless Area Network (6LoWPAN)), ANT or ANT+(Advanced Network Tools) technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols.

In one example, the communications interface 412 is Bluetooth® technology for communicating with a mobile app on a mobile device. For example, users of the system 400 may have one or more computing devices 450 that can be used to communicate with the trombone slide position indicator 100. Computing devices 450 can be any desktop computer, laptop computer, tablet device, mobile phone, smartphone, and the like. A trombone app 452 is running on the computing device 450. The trombone app 452 can be, for example, for Android and iOS. In one example, the computing device 450 vibrates or makes a sound when paired with the trombone slide position indicator 100.

Using the trombone app 452, information can be transmitted in wireless fashion (e.g., using the Bluetooth® technology) from the trombone slide position indicator 100 to the computing device 450. The trombone app 452 has capability to process and display any information from the trombone slide position indicator 100.

Optionally, in system 400, the trombone slide position indicator 100 can include a controller (not shown) and local data storage (not shown) for providing more advanced capabilities.

Referring now again to FIG. 1 through FIG. 13, the trombone slide position indicator 100 is not limited to magnet-based tactile indicators or to the simple visual indicator shown in FIG. 11. The trombone slide position indicator 100 can include other types of indicators, such as audible indicators (perhaps delivered through a smartphone using the trombone app 452), tactile indicators based on vibration (perhaps delivered through a smartphone in the user's pocket using the trombone app 452), visual indicators using light-emitting diodes (LEDs), and the like.

The presently disclosed trombone slide position indicator 100 may include one, some, or all of the following features.

1. The hardware forming the trombone slide position indicator 100 does not interfere with normal operation or "playing" of the instrument, nor does it affect the instrument's timbre. Playing the instrument with the trombone slide position indicator 100 attached does not impart awkwardness to its use nor its appearance.
2. The hardware forming the trombone slide position indicator 100 can be ultra-light (e.g., not to exceed 400 grams), especially the portion that is mounted to the outer (moveable) slide. The trombone slide position indicator 100 does not noticeably impede acceleration and deceleration of the slide's movement while playing.
3. The hardware forming the trombone slide position indicator 100 does not add any noticeable friction to the slide's movement.
4. The hardware forming the trombone slide position indicator 100 can be easily installed and quickly removable to facilitate putting the instrument in its case and aid in making it convenient to use.
5. The hardware forming the trombone slide position indicator 100 can allow the independent adjustment of each of its position sensors to accommodate variations from one instrument to another. These variations can be significant.
6. The amount of tactile neuro-mechanical feedback ("feel") can be adjustable to suit the learner's preference.
7. The repeatability and accuracy of the trombone slide position indicator 100 can be in the range expected by other reasonable precise industrial mechanisms, perhaps ±0.5 mm or ±1 mm.
8. The trombone slide position indicator 100 is designed and constructed in such a way to accommodate the addition of electronic signal acquisition (see system 400 of FIG. 13). This allows connection with computer and software monitoring to develop software programmed learning and measurement of progress outcomes.
9. The hardware forming the trombone slide position indicator 100 can be robust enough to withstand the rigors of most beginning students.
10. In reality, the trombone has more than 7 positions to accommodate acoustic imperfections/nonlinearities inherent to all musical instruments. The ideal embodiment of trombone slide position indicator 100 includes the ability to learn at least the most common of these "special case" positions.
11. The trombone slide position indicator 100 can be accompanied by "best use" methodological materials in the form of, but not limited to, written procedural guides, instructional videos, and computer software.
12. There are 4 basic sizes of trombones; alto, small bore tenor, large bore tenor, and bass. Within each size category, there are differences in sizes and shapes where the mounting hardware of the trombone slide position indicator 100 must mount. In the trombone slide position indicator 100, the mounting hardware can accommodate all trombones, whether by adjustments, or special purpose parts, and employing different mounting methods.

In some embodiments, the trombone slide position indicator 100 can be provided as an external accessory which provides at least 6 adjustable slide position indicators and a separate lightweight adjustable magnetic guide which is attached to, and which moves with the slide, and which includes very precise and specialized mounting hardware, as described with reference to FIG. 2 through FIG. 9.

In other embodiments, the trombone slide position indicator 100 can be provided as an external and easily removable device as described above, but in which the required mounting hardware is permanently attached and included on a new instrument, wherein the mounting hardware components are added during the instrument's manufacturing process.

In yet other embodiments, the trombone slide position indicator 100 can be provided as an external accessory which provides at least 6 adjustable magnetic position sensors and a separate lightweight adjustable magnetic guide which is attached to, and which moves with the slide, and which includes very precise and specialized mounting hardware, along with provisions for the addition of electronic position acquisition for direct visual feedback via LED and/or communication with computer or smartphone, together comprising an easily removable device.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A trombone slide position indicator device comprising a trombone slide position rod mounted in a fixed position in relation to the outer slide of the trombone, wherein a plurality of slide position indicators are provided along the length of the slide position rod, and wherein the positions of the slide position indicators correspond to certain pitches or notes associated with a given trombone slide position.

2. The trombone slide position indicator device of claim 1, further comprising a sensor guide mounted to the outer slide, wherein the sensor guide moves with the outer slide and in relation to the fixed slide position rod, and wherein the sensor guide comprises a mechanism for detecting and/or indicating close proximity to any one of the slide position indicators along the slide position rod.

3. The trombone slide position indicator device of claim 2, wherein the sensor guide utilizes magnetic force to generate a tactile indicator.

4. The trombone slide position indicator device of claim 3, wherein the sensor guide is configured to generate a tactile and/or visual cue to the user as the sensor guide passes in close proximity to any one of the slide position indicators along the slide position rod.

5. The trombone slide position indicator device of claim 4, further wherein the sensor guide is coupled atop a forward mount.

6. The trombone slide position indicator device of claim 5, further wherein a rod attachment fitting is provided for holding the proximal end of the slide position rod, and wherein the rod attachment fitting is coupled atop a rear mount.

7. The trombone slide position indicator device of claim 6, further wherein a slide stop is provided at the distal end of the slide position rod.

8. The trombone slide position indicator device of claim 7, wherein the plurality of slide position indicators provided along the length of the slide position rod comprise up to seven slide position indicators.

9. The trombone slide position indicator device of claim 8, wherein the trombone comprises a bell, a tuning slide, a bell brace, a mouthpiece, a mouthpiece receiver, a slide receiver, a first slide brace, a second slide brace, an inner slide, and an outer slide.

10. The trombone slide position indicator device of claim 9, wherein the rear mount is fastened to the mouthpiece receiver and the first slide brace, thereby holding the rear mount in a fixed position relative to the mouthpiece.

11. The trombone slide position indicator device of claim 10, wherein the rod attachment fitting holding the proximal end of the slide position rod is coupled to the rear mount, thereby holding the slide position rod in a fixed position relative to the mouthpiece.

12. The trombone slide position indicator device of claim 11, wherein the forward mount is fastened to the outer slide at the second slide brace, wherein the forward mount is moveable together with the outer slide relative to the mouthpiece.

13. The trombone slide position indicator device of claim 12, wherein the slide position rod is supported on one end by the rear mount and passes through the center portion of the sensor guide.

14. The trombone slide position indicator device of claim 13, wherein the forward mount and the rear mount hold the slide position rod substantially parallel to the outer slide.

15. The trombone slide position indicator device of claim 14, wherein the sensor guide is configured to slide along the slide position rod without interfering with the movement of the outer slide when the user moves the outer slide when playing the trombone.

16. The trombone slide position indicator device of claim 15, wherein the sensor guide further comprises a magnet, wherein the slide position rod is formed of a non-ferromagnetic, non-magnetically responsive material, and wherein the slide position indicators are formed of ferromagnetic, magnetically responsive material.

17. The trombone slide position indicator device of claim 16, wherein the magnetically responsive slide position indicators are configured such that as they pass by the magnet in the sensor guide the user is provided with tactile feedback comprising a slight momentary resistance due to the magnetically responsive slide position indicator entering and then departing the magnetic field of the magnet.

18. The trombone slide position indicator device of claim 15, wherein the slide position indicators comprise magnets, wherein the slide position rod is formed of a non-ferromagnetic, non-magnetically responsive material, and wherein the sensor guide is formed of ferromagnetic, magnetically responsive material.

19. The trombone slide position indicator device of claim 18, wherein the slide position indicators comprising magnets are configured such that as the magnetically responsive sensor guide passes the slide position indicators the user is provided with tactile feedback comprising a slight momentary resistance due to the magnetically responsive sensor guide entering and then departing the magnetic field of the magnet.

20. The trombone slide position indicator device of claim 19, wherein seven slide position indicators are provided along the slide position rod in positions that substantially correspond to certain pitches or notes, and wherein starting at the rod attachment fitting and in order, the first slide position indicator corresponds to the pitches or notes associated with the first trombone slide position, the second slide position indicator corresponds to the pitches or notes associated with the second trombone slide position, the third slide position indicator corresponds to the pitches or notes associated with the third trombone slide position, the fourth slide position indicator corresponds to the pitches or notes associated with the fourth trombone slide position, the fifth slide position indicator corresponds to the pitches or notes associated with the fifth trombone slide position, the sixth slide position indicator corresponds to the pitches or notes associated with the sixth trombone slide position, and the seventh slide position indicator corresponds to the pitches or notes associated with the seventh trombone slide position.

* * * * *